United States Patent
Kim

(10) Patent No.: US 6,848,559 B2
(45) Date of Patent: Feb. 1, 2005

(54) SHIFT LOCKING APPARATUS FOR AN AUTOMATIC TRANSMISSION

(75) Inventor: Sang Jin Kim, Suwon (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/374,591

(22) Filed: Feb. 25, 2003

(65) Prior Publication Data

US 2004/0216980 A1 Nov. 4, 2004

(30) Foreign Application Priority Data

Jul. 3, 2002 (KR) ........................................ 2002-38388

(51) Int. Cl.⁷ .......................... B60K 41/26; B60K 41/28
(52) U.S. Cl. ................... 192/220.2; 70/245; 74/473.23; 477/96
(58) Field of Search ................. 192/220.2; 477/96; 70/245; 74/473.23

(56) References Cited

U.S. PATENT DOCUMENTS

| | | | | |
|---|---|---|---|---|
| 5,014,831 A | * | 5/1991 | Wawra et al. | 477/96 |
| 5,027,929 A | * | 7/1991 | Ratke et al. | 477/96 |
| 5,588,514 A | * | 12/1996 | Snell | 192/220.2 |
| 5,685,405 A | * | 11/1997 | Morikawa et al. | 192/220.2 |
| 5,695,429 A | * | 12/1997 | Kataumi et al. | 477/96 |
| 5,752,414 A | * | 5/1998 | Reasoner et al. | 477/96 |
| 5,846,158 A | * | 12/1998 | Tazai | 477/96 |
| 5,996,763 A | * | 12/1999 | Tsuge | 477/96 |
| 6,371,271 B1 | * | 4/2002 | Hong | 192/220.3 |

FOREIGN PATENT DOCUMENTS

EP           1 378 688 A2        7/2004

* cited by examiner

Primary Examiner—Rodney H. Bonck
(74) Attorney, Agent, or Firm—Morgan Lewis & Bockius LLP

(57) ABSTRACT

A shift locking apparatus for an automatic transmission includes a lock cam connected to a shift lock cable and a key lock cable, respectively. The lock cam is positioned between a latched and unlatched state depending on an engaged or disengaged state of the brake pedal. A shift lock pin cooperates with the lock cam via the shift lock cable to lock or release the shift lever in or from a 'park' position.

13 Claims, 6 Drawing Sheets

SHIFT LOCKING APPARATUS FOR AN AUTOMATIC TRANSMISSION

FIELD OF THE INVENTION

The present invention relates to a shift locking apparatus for an automatic transmission. More specifically, the present invention is directed to a shift locking apparatus for an automatic transmission capable of providing both a shift locking function and a key locking function.

BACKGROUND OF THE INVENTION

A wide variety of devices have been applied to automatic transmissions of vehicles to attempt to avoid dangerous situations. An example of a dangerous situation is the possible unexpected and sudden acceleration of the vehicle. In order to avoid this and similar dangerous situations, a shift locking apparatus or a key locking apparatus has generally been used as a device to lock the transmission into or out of a particular setting.

The conventional shift locking apparatus allows a shift lever to shift from a 'park' position into another position in the speed change range only when the brake pedal is depressed. The conventional key locking apparatus allows the key for starting the vehicle to be withdrawn from the key slot only when the shift lever is in the 'park' position after the key is turned into the off position. Typically, an electrical driving apparatus, such as a solenoid or an actuator is used to lock the key into the ignition while the transmission is not in 'park'. A key locking apparatus is generally installed separate from a shift locking apparatus.

In general, the conventional shift locking apparatus and key locking apparatus are designed to operate electrically. A drawback with this design is that an actuator, as a main component in the respective apparatuses, is expensive, increasing the overall production cost of a vehicle. Furthermore, another drawback in that because the actuator is operated by electricity, the actuator cannot be operated when the battery of the vehicle is not sufficiently charged. Still further, the key locking apparatus and the shift locking apparatus are typically operated independently from each other. Therefore, another drawback is that the number of components of the vehicle is increased, thus production costs and assembly time are increased and the overall production process is complicated.

SUMMARY OF THE INVENTION

Embodiments of the present invention provide a shift locking apparatus for an automatic transmission comprising a lock cam that connects, along its circumference, to a shift lock cable on one part and to a key lock cable on another part. The lock cam is further provided with a latching step on a third part. Also included is a latching means that moves forward or backward by a contact force of a brake pedal or by an elastic force of at least one spring and having at least another spring to perform a retraction or extension. Furthermore, the contact force causes the latching step of the lock cam to be latched or unlatched depending on the depressed or released state of the brake pedal and on a pivotal movement of the lock cam. A casing, housing the lock cam and the latching means therein, for constraining the lock cam within a pivotal angle of the latched state or unlatched state and restraining the latching means to be in a retracted or extended state. A shift lock pin moves forward or backward by a contact force of a shift lever or by an elastic force of at least one spring. The shift lock pin also cooperates with the lock cam via the shift lock cable to lock or release the shift lever in a 'park' position.

In an aspect of the present invention, the latching means further comprises a stopper pin placed into a reverse or backward position under the contact force from the brake pedal when the brake pedal is disengaged, but into a progressive or forward position under the elastic force from the first spring when the brake pedal is engaged. A cylinder, housing a piston that is integrally connected with the stopper pin, has a second spring which is disposed between a free end of the piston and a closed end of the cylinder, opposite to the free end of the piston, with a spring constant larger than that of the first spring, provides an elastic force of the second spring toward the cam when the brake pedal is disengaged, and moves close to the stopper pin when the brake pedal is engaged.

In another aspect of the present invention, the cylinder preferably causes the lock cam to be in the latched or unlatched state depending on the pivotal movement of the lock cam.

In yet another aspect of the present invention the distance in which the stopper pin travels, together with the cylinder by the elastic force of the first spring, is the same distance that the cylinder travels by the elastic force of the second spring.

In yet still another aspect of the present invention the shift lock pin is provided with an elastic force directing it to a forward position by a third spring and with the shift lever contact force directing it to the backward position.

A further aspect of the present invention provides the lock cam pivoted into the latched state when the shift lock pin is in the forward or extended position. However, the lock cam is pivoted into the unlatched state when the shift lock pin is in the backward or retracted position.

Another still further aspect of the present invention provides the shift lock pin to cause the shift lever to be locked in a 'park' position when the shift lock pin is in the forward position. However, the shift lever is movable to another position in a speed change range when the shift lock pin is in the backward position.

In yet a further aspect of the present invention a lock cable is connected to a key unit, allowing the lock cam to be pivoted from the latched state into the unlatched state when the key unit is operated to put a key out of a locked position.

In yet still another further aspect of the present invention the lock cable is connected to a key unit, allowing a key to be put into a locked position by transmitting the latched state of the lock cam into the key unit.

DETAILED DESCRIPTION OF THE PREFERRED EMBODIMENTS

Figure 1:
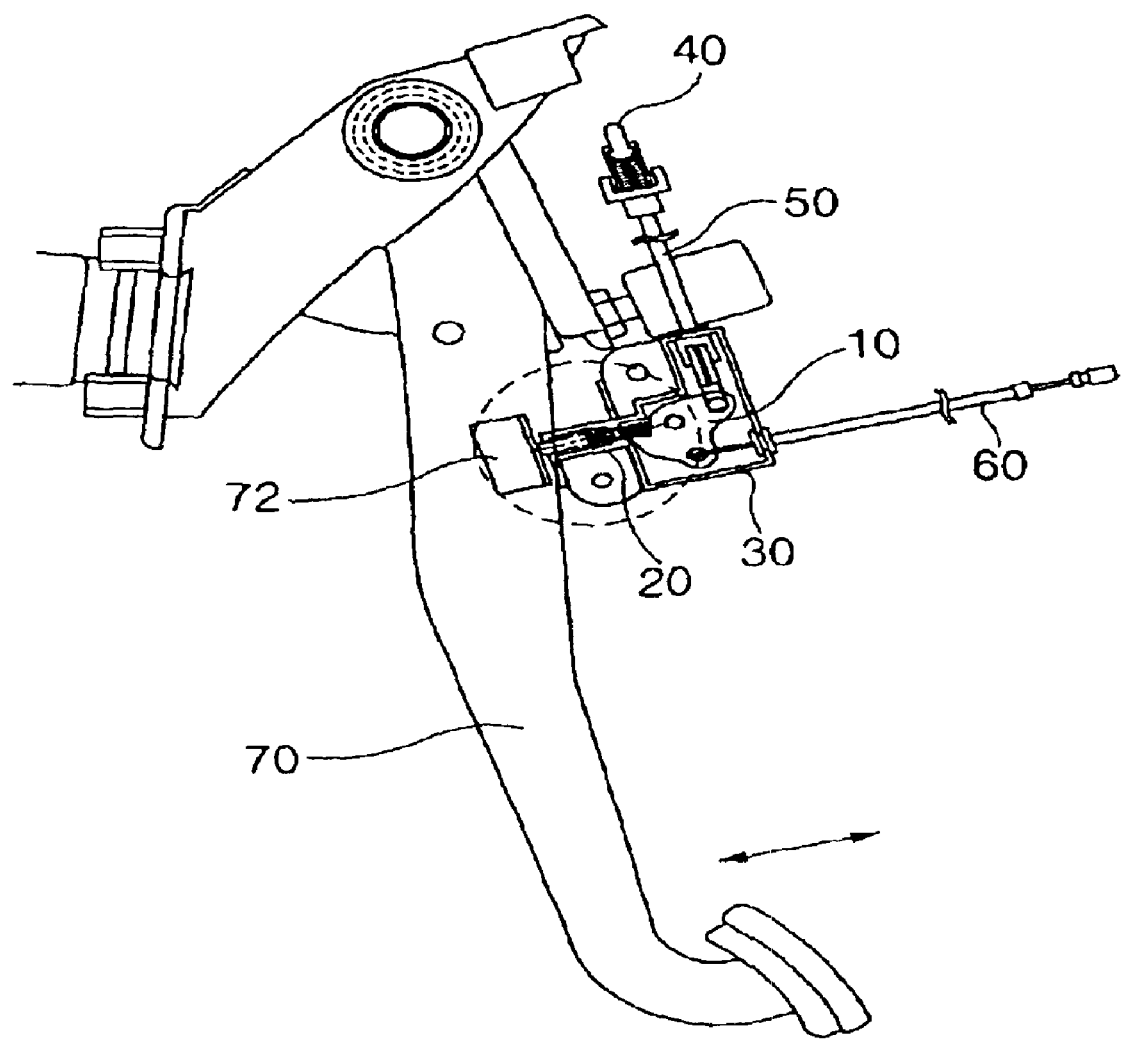
FIG. 1 is a schematic side sectional view of a shift locking apparatus according to an embodiment of the present invention.

FIG. 1 shows a shift locking apparatus according to an embodiment of the present invention. The shift locking apparatus includes a lock cam 10 connected to both a shift lock cable 50 and a key lock cable 60. Further included is a latching means 20 that cooperates with the lock cam 10 and causes the lock cam 10 to be latched or unlatched depending on whether the brake pedal 70 is engaged or disengaged.

Figure 2:
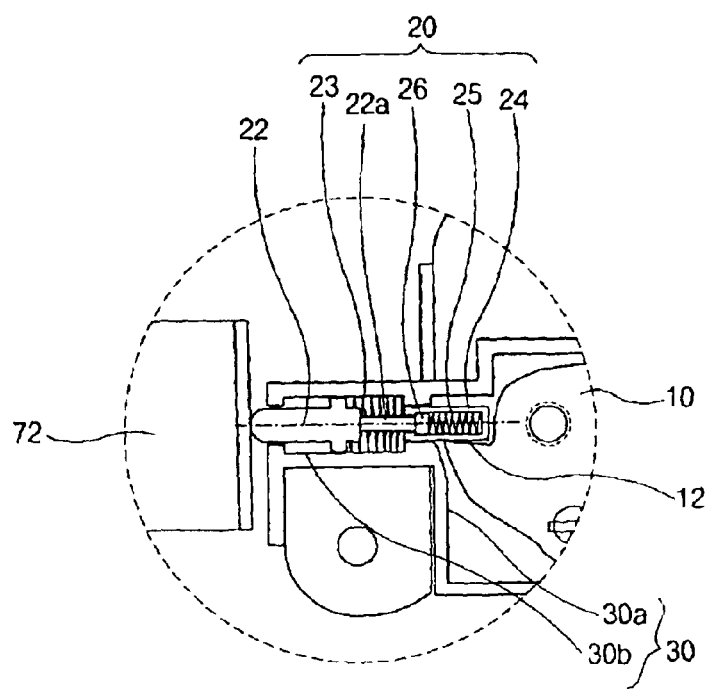
FIG. 2 is a detailed sectional view of a brake pedal stopper of the shift locking apparatus shown in FIG. 1.

The shift locking apparatus further comprises a casing 30 that receives both the lock cam 10 and the latching means 20. The casing 30 provides fastening capabilities for the lock cam 10 and the latching means 20 to a vehicle chassis. Also, there is a shift lock pin 40 that cooperates with the lock cam 10 through a shift lock cable 50 that locks the shift lever 80 into 'park' or releases the shift lever 80 from 'park'. The lock cam 10 is connected, along its circumference, to the lock cable 50 on one part and to the key lock cable 60 on a second part. Furthermore, the lock cam 10 has a latching step 12 on a third part, FIG. 2.

The latching step 12 has a step-like shape so that one end of the latching means can be placed on or out of the latching step. The latching step 12 allows the lock cam 10 to be pivoted and maintained in the illustrated latched state L or unlatched state U, FIG. 4a.

The latching means 20 is pushed against or released from a pedal stopper 72 provided on one side of the brake pedal 70. The latching means 20 is activated by depressing or releasing the brake pedal 70. In use, when the brake pedal 70 is disengaged, the latching means 20 is pushed against a pedal stopper 72. On the contrary, when the brake pedal 70 is engaged, the latching means 20 is released from a pedal stopper 72, FIG. 1.

The latching means 20 is subjected to a contact force from the pedal stopper 72 when the brake pedal is released and to an elastic force from a first spring 23 when the latching means 20 is released from a pedal stopper 72. Therefore, the latching means moves forward and backward, changing its total length by retraction or extension of a second spring 25. The forward and backward movement and the retracting or extending movement of the latching means 20 are activated dependent upon engaging or disengaging the brake pedal 70 and on the pivotal movement of the lock cam 10. The two movements of the latching means 20 function to maintain the latching step 12 of the lock cam 10 in the latched position L or in the unlatched position U.

The latching means 20 further comprises a stopper pin 22 and a cylinder 24. When the brake pedal 70 is disengaged the stopper pin 22 is placed in a reverse or backward position B by the contact force of the brake pedal 70. However, when the brake pedal 70 is engaged the stopper pin 22 is placed in a progressive or forward position F by the elastic force of the first spring 23.

A piston 26 is housed within the cylinder 24. The piston 26 is integrally connected with the stopper pin 22 through an intermediate bar 22a. A second spring 25 is disposed between a free end of the piston 26 and a closed end of the cylinder 24, opposite to the free end of the piston 26. The second spring 25 has a spring constant larger than that of the first spring 23.

The cylinder 24 is subjected to the elastic force of the second spring 25. The force of the second spring 25 is directed toward the lock cam 10 when the brake pedal 70 is disengaged. On the contrary, the cylinder 24 moves forward, coming together with the stopper pin 22 by the elastic force of the first spring 23 when the brake pedal 70 is engaged. Therefore, when the brake pedal 70 is disengaged and the lock cam 10 is latched, the cylinder 24 is placed on the latching step 12 of the lock cam 10. When the brake pedal 70 is engaged the cylinder 24 moves, together with the stopper pin 22, to a position where the cylinder 24 is out of the latching step 12 of the lock cam 10. Thereby, the lock cam 10 can be pivoted into the unlatched state U. The distance that the stopper pin 22 moves, together with the cylinder 24, by the elastic force of the first spring 23, is preferably equivalent to that which the cylinder 24 moves by the elastic force of the second spring 25.

The lock cam 10 and the latching means 20 are housed within the casing 30 and the casing 30 is fastened to a vehicular chassis. The casing 30 includes a first container 30a for receiving the lock cam 10 and a second container 30b for receiving the latching means 20, FIG. 2. The first container 30a has a rotatable shaft of the lock cam mounted to it and it constrains the lock cam from pivoting beyond a certain angle during the latching L and unlatching U of the lock cam 10. The second container 30b is constructed to allow the latching means 20 to move forward or backward during retraction or extension so that the latching means 20 can be placed on or released from the latching step 12. Furthermore, the casing 30 has a first through hole through which the shift lock cable 50 passes. The casing 30 also has a second through hole through which the key lock cable 60 passes and a third through hole through which the free end of the stopper pin 22 protrudes toward the brake pedal 70. The casing 30 is also provided with a plurality of fastening brackets so as to be fastened onto the chassis of a vehicle.

Figure 3A:
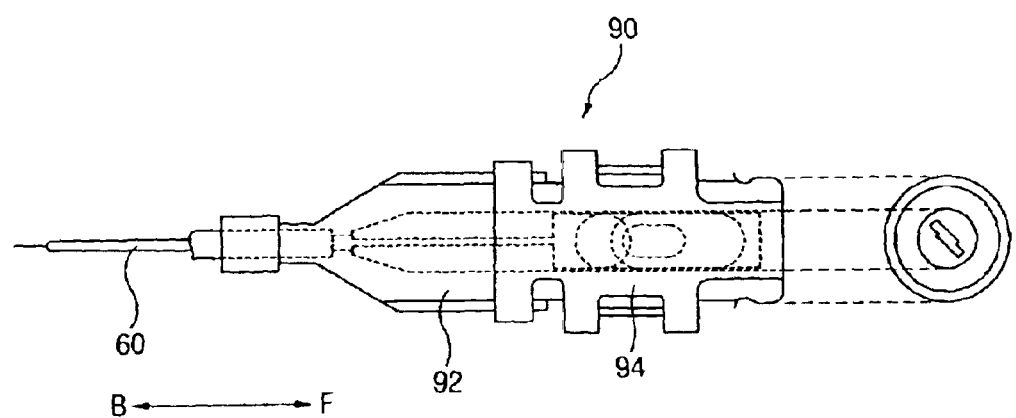
FIG. 3a is a detailed sectional view of a key unit of the shift locking apparatus shown in FIG. 1.
Figure 3B:
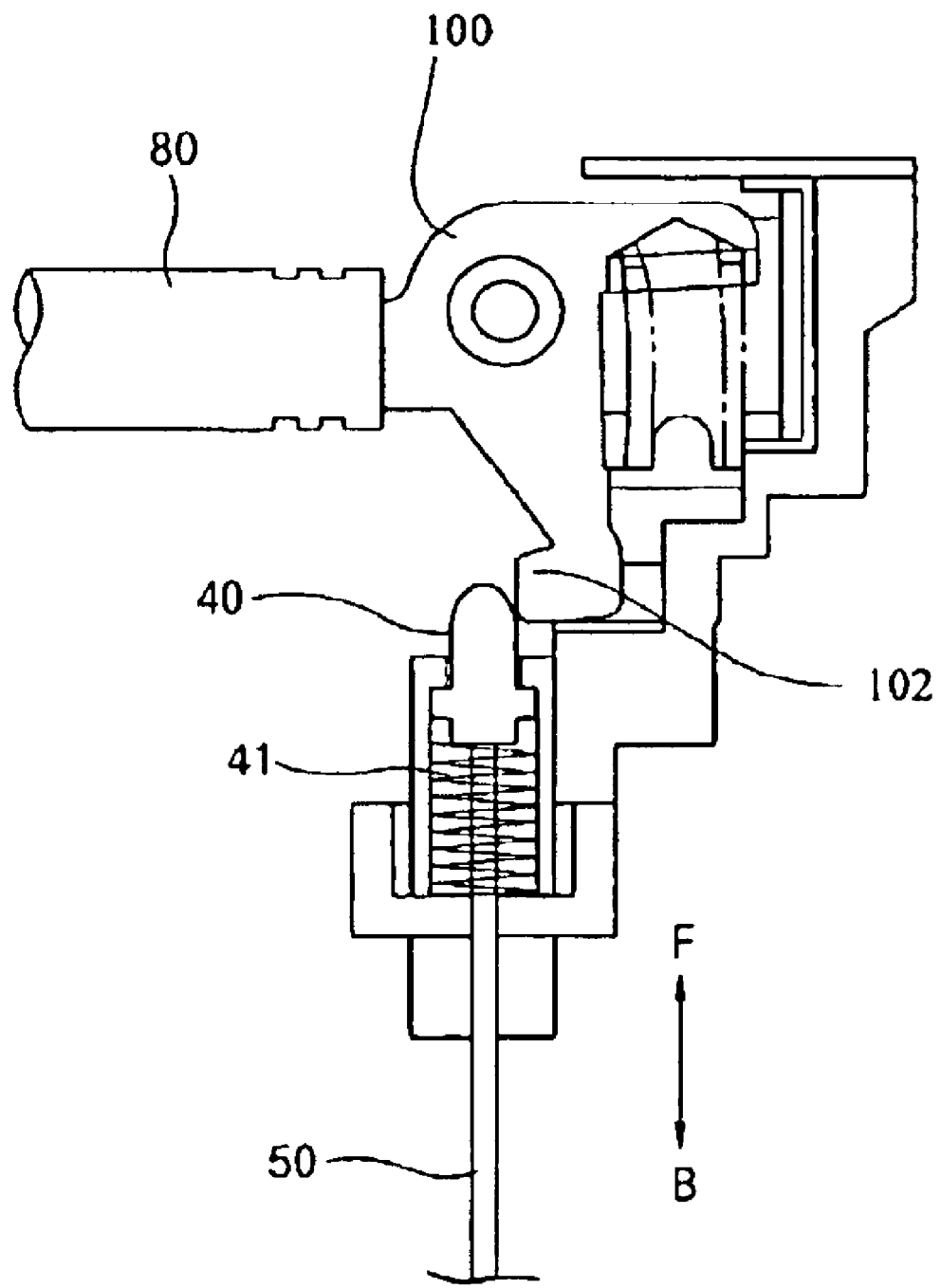
FIG. 3b is a detailed sectional view of a shift lever of the shift locking apparatus shown in FIG. 1.

FIG. 3b shows a shift lock pin 40 that can be moved backward by a contact force of a buttress nub 102 on a shift lever cam 100 that is connected to a shift lever 80 or be moved forward by an opposite elastic force of a third spring 41. In use, the forward or backward movement of the shift lock pin 40 takes place in cooperation with the rotation of the lock cam 10 via the shift lock cable. This locks the shift lever 80 in a 'park' position when the shift lock pin 40 is in a forward position F. The shift lever 80 is released to allow shifting from the 'park' position when the shift lock pin 40 is in a backward position B.

When the brake pedal 70 is engaged, the latching means 20 moves forward to the pedal stopper 72. The latching means 20 then moves out of the latching step 12 of the lock cam 10. This allows the lock cam 10 to pivot into the unlatched state U. In this case, if a driver manipulates the shift lever 80, the shift lock pin 40 moves backward by the contact force of the shift lever 80. The contact force of the shift lever 80 is transmitted through the shift lock cable 50 to the lock cam 10, so that the lock cam 10 can be pivoted into the unlatched state U.

Figure 4A:
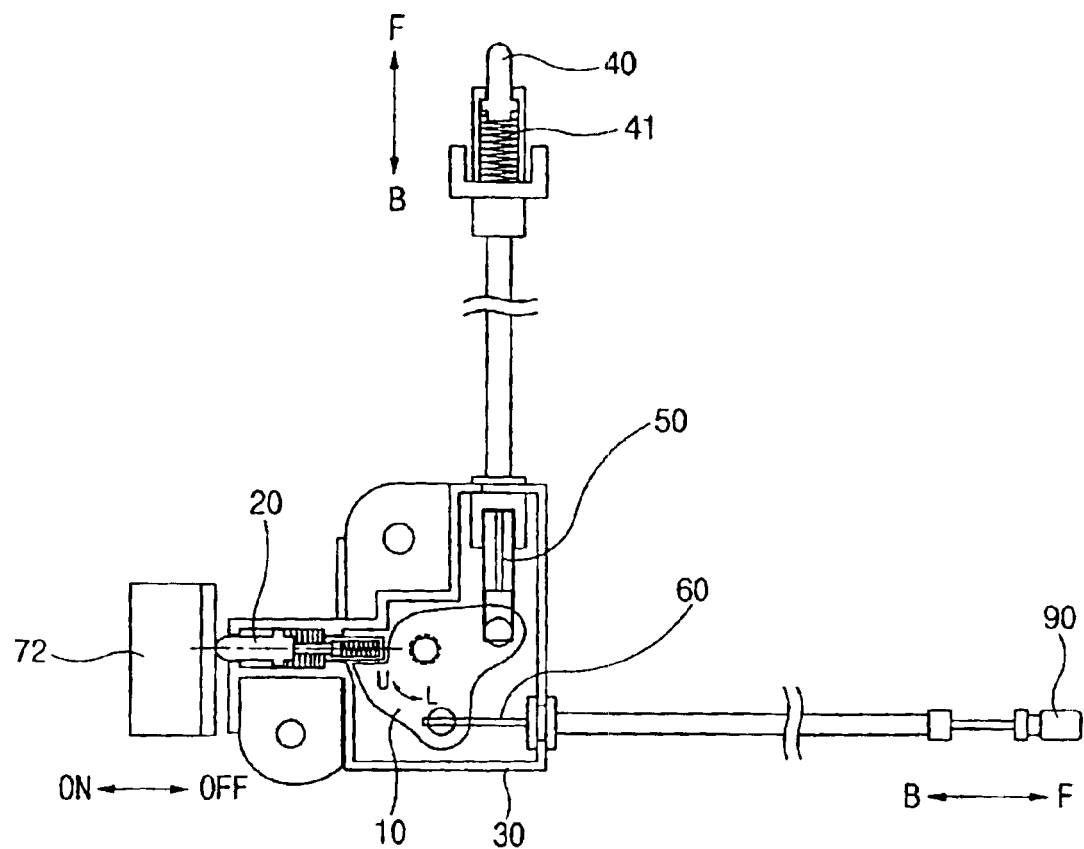
FIGS. 4a–4c are operation views of the shift locking apparatus shown in FIG. 1.
Figure 4B:
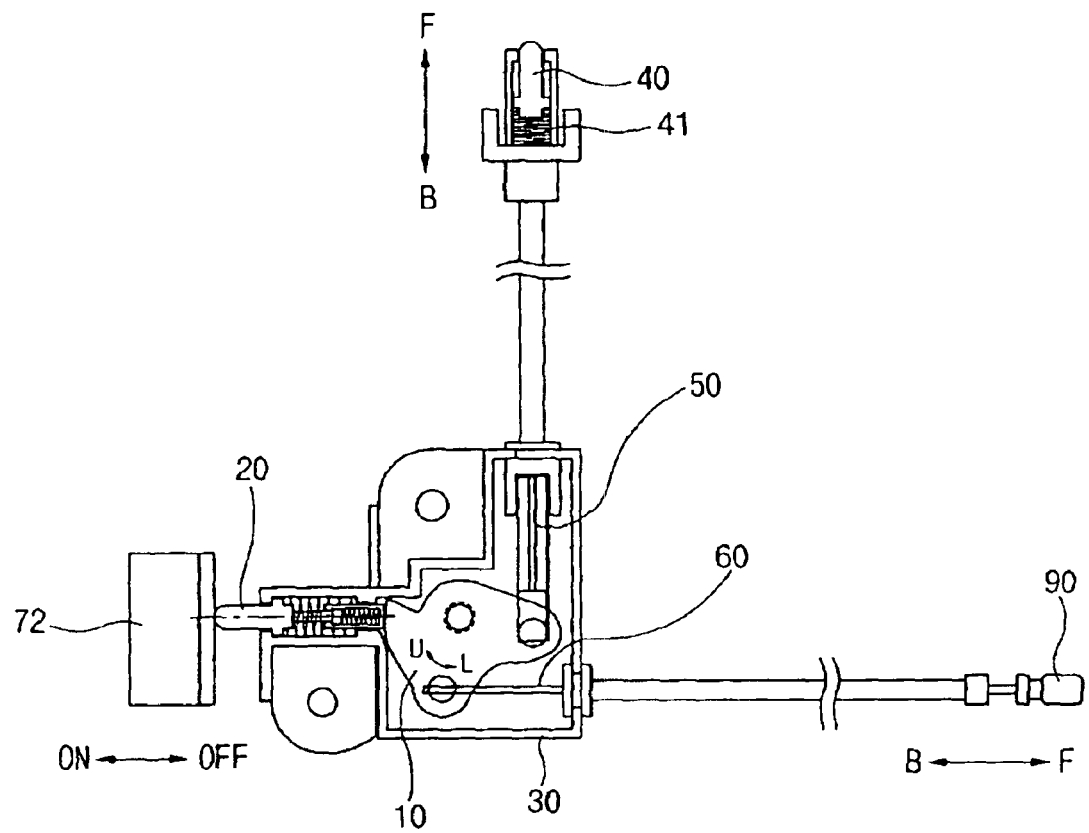
Figure 4C:
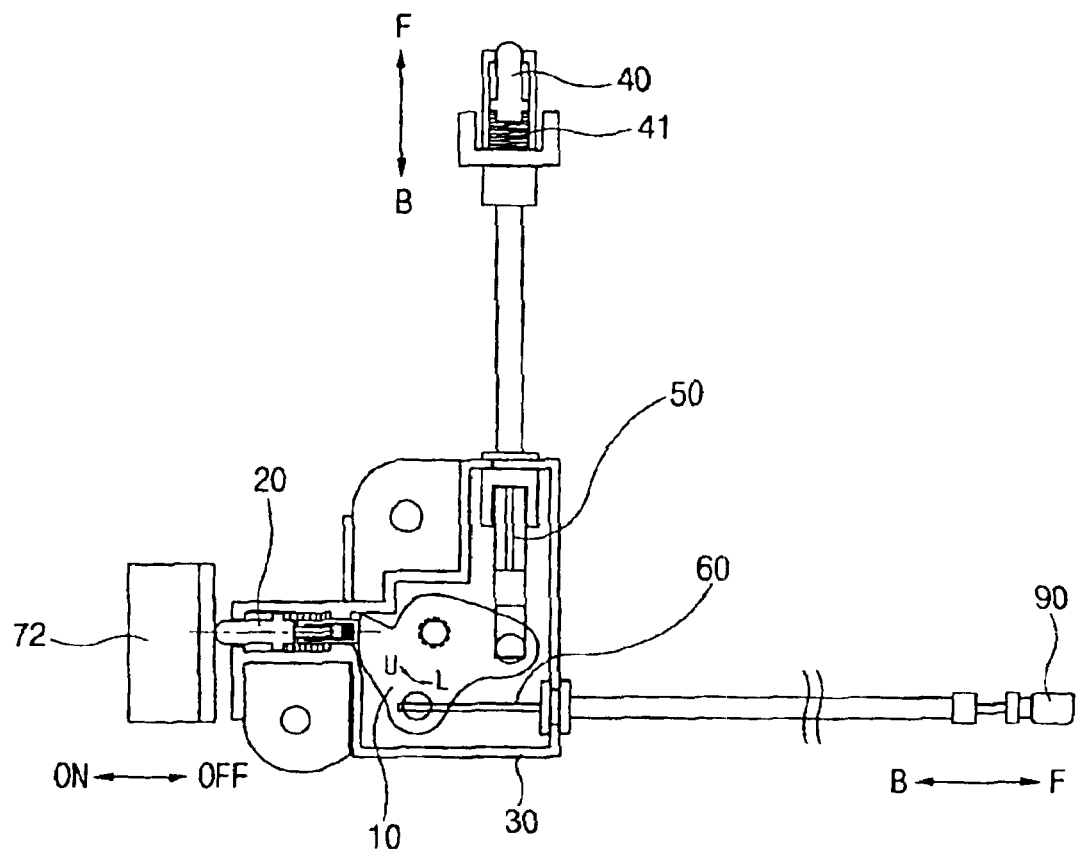

FIGS. 4a–4c show a working progression of the shift locking apparatus. When the lock cam 10 is in the latched state L, the shift lock cable 50 and the key lock cable 60 are maintained in their respective forward position F. Also, the latching means 20 is maintained in the backward position B. On the contrary, when the lock cam 10 is in the unlatched state U, the shift lock cable 50 and the key lock cable 60 are kept in their respective backward position B, while the latching means 20 is kept in the forward position F. When the shift lock cable 50 is in the forward position F, the shift lock pin 40 constrains the shift lever 80 from pivoting so that the shift lever is prevented from shifting from the 'park' position. When the key lock cable 60 is in the forward position F, a cylinder 92 of a key unit 90 is moved toward a key lock block 94 so that the key can be kept drawn back from the key unit 90, FIG. 3a.

The operations of an embodiment according to the present invention will be described below with respect to FIGS. 4a–4c.

FIG. 4a shows the brake pedal 70 disengaged and the gear shift lever locked in the 'park' position. The pedal stopper 72 depresses the latching means 20 positioning the cylinder 24 onto the latching step 12 such that the lock cam 10 is prevented from being pivoted from the latched state L into the unlatched state U. As a result, the shift lock pin 40 connected to the lock cam 10 via the shift lock cable 50 cannot be moved into the backward position B. Therefore, the shift lever 80 is prevented from shifting from the 'park' position. In this position, the first spring 23 is retracted and the second spring 25 is extended. It is preferable that the second spring 25 has a spring constant larger than the first spring 23.

FIG. 4b shows the structure where a driver depresses the brake pedal 70 into the engaged state and manipulates the shift lever 80 to press the shift lock pin 40 into the backward position B. The latching means 20 moves into the forward position by the elastic force of the first spring 23. Thereafter, the lock cam 10 can be pivoted allowing the shift lock pin 40 to move toward the backward position.

When a driver manipulates the shift lever 80 applying a contact force toward the backward position B, both the shift lock pin 40 and the shift lock cable 50 move backward and the lock cam 10 is pivoted into the unlatched state U. The shift lever 80 is then allowed to shift from the 'park' position into another position in the speed change range. In addition, the key lock cable 60 is moved into the backward position by the pivotal movement of the lock cam 10 so that the key is prevented from being removed. In this case, both the first spring 23 and the second spring are extended.

FIG. 4c shows the situation where a driver releases the brake pedal 70 and the lock cam 10 remains in the unlatched position U. The stopper pin 22 of the latching means 20 is pressed down by the pedal stopper 72 to move into the backward position. However, even though the stopper pin 22 is moved into the backward position, the cylinder 24 is maintained without any movement. This results from the fact that the shift lock pin 40 is maintained in the backward position B by the shift lever 80, thus, the lock cam 10 is withheld from rotating and maintained in the unlatched position U. Therefore, the latching means 20 remains under compression. Specifically, both the first and second springs 23 and 25 are retracted.

If the driver manipulates the shift lever 80 again to the 'park' position, the shift lock pin 40 moves into the forward position F by the elastic force of the third spring 41, the lock cam 10 pivots into the latched state L, and the latching means 20 is moved backward by the elastic force of the second spring 25 positioning the cylinder 24 on the latching step 12. Thereby, locking the shift lever into 'park'.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A shift locking apparatus for an automatic transmission, the shift locking apparatus comprising:
    a lock cam for connecting, along its circumference, to a shift lock cable on one part, to a key lock cable on another part, and having a third part provided with a latching step;
    a latching means allowed to move forward or backward by a contact force of a brake pedal or by an elastic force of at least one spring thereby engaging the latching step of the lock cam and causing the lock cam to be in a latched or unlatched state depending on an engaged or disengaged state of the brake pedal and on a pivotal movement of the lock cam wherein the latching means further comprises;
    a stopper pin for placing into a reverse or backward position under contact force from the brake pedal when the brake pedal is disengaged, but into a progressive or forward position under elastic force from a first spring when the brake pedal is engaged;
    a cylinder for housing a piston integrally connected with the stopper pin;
    a second spring which has a spring constant larger than that of the first spring, the second spring being disposed between a free end of the piston and a closed end of the cylinder opposite to the free end of the piston, whereby the cylinder is provided with elastic force of the second spring toward the cam when the brake pedal is disengaged but moves together with the stopper pin when the brake pedal is engaged;
    a casing housing the lock cam and the latching means therein, for constraining the lock cam within a pivotal angle of the latched state or unlatched state and restraining the latching means to be in a retracted or extended state; and
    a shift lock pin, allowed to move forward or backward by a contact force of a shift lever or by an elastic force of at least one spring, for cooperating with the lock cam via the shift lock cable to lock or release the shift lever in a parking position.

2. A shift locking apparatus according to claim 1, wherein the cylinder causes the lock cam to be in the latched or unlatched state depending on the pivotal movement of the lock cam.

3. A shift locking apparatus according to claim 1, wherein a distance which the stopper pin is caused to travel together with the cylinder by the elastic force of the first spring, is equal to that which the cylinder is caused to travel by the elastic force of the second spring.

4. A shift locking apparatus according to claim 1, wherein the shift lock pin is provided with the elastic force directing it to the forward position by a third spring and with the contact force directing the shift lock pin to the backward position by a shift lever.

5. A shift locking apparatus according to claim 4, wherein the lock cam is pivoted into the latched state when the shift lock pin is in the forward position but into the unlatched state when the shift lock pin is in the backward position.

6. A shift locking apparatus according to claim 1, wherein the shift lock pin causes the shift lever to be locked in a parking position when the shift lock pin is in the forward position but to be movably released in another position in a speed change range when the shift lock pin is in the backward position.

7. A shift locking apparatus according to claim 1, wherein the lock cable is connected to a key unit, allowing the lock cam to be pivoted from the latched state into the unlatched state only when the key unit is operated to put a key out of a locked position.

8. A shift locking apparatus according to claim 1, wherein the lock cable is connected to a key unit, allowing to put a key into a locked position by transmitting the latched state of the lock cam into the key unit.

9. A shift locking apparatus for an automatic transmission, comprising:
    a lock cam rotatably coupled within a housing;

a key unit coupled with said lock cam through a key lock cable;

a shift lock mechanism coupled with said lock cam through a shift lock cable, wherein said shift lock mechanism further comprises a depressible shift lock pin and wherein depressing said shift lock pin depresses a spring and when the brake pedal is depressed by a driver, said compressed spring urges said shift lock cable to rotate said lock cam to an unlocked position; and a brake latching mechanism, wherein said brake latching mechanism latches with said lock cam when a brake pedal of a vehicle is released and a shift lever of an automatic transmission of the vehicle is in park such that a gear of the automatic transmission will not be engaged unless a driver depresses the brake pedal, inserts a key into said key unit, and adjusts the shift lever.

10. The apparatus of claim 9, wherein said lock cam is configured with a latching step for receiving said brake latching mechanism.

11. The apparatus of claim 9, wherein said key unit locks and unlocks said key lock cable such that said lock cam is withheld from rotation when said key unit is in a locked state.

12. The apparatus of claim 9, wherein a key received by said key unit is locked within said key unit following rotation of said lock cam.

13. The apparatus of claim 9, wherein said key unit is in a locked position when a key of said key unit is removed from said key unit.

* * * * *